(12) United States Patent
Matsko et al.

(10) Patent No.: US 7,184,624 B1
(45) Date of Patent: Feb. 27, 2007

(54) VERTICALLY-COUPLED WHISPERING GALLERY MODE RESONATOR OPTICAL WAVEGUIDE, AND METHODS

(75) Inventors: Andrey B. Matsko, Pasadena, CA (US); Anatoliy A. Savchenkov, Glendale, CA (US); Lute Maleki, Pasadena, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/422,147

(22) Filed: Jun. 5, 2006

(51) Int. Cl.
*G02B 6/42* (2006.01)
*H01S 3/08* (2006.01)
*H01S 3/00* (2006.01)

(52) U.S. Cl. .............................. 385/30; 385/15; 385/27; 385/28; 385/24; 385/32; 385/39; 372/97; 372/98; 372/94; 372/92; 359/346

(58) Field of Classification Search .................. 385/15, 385/27, 28, 24, 30, 32, 39; 372/97, 98, 94, 372/92; 359/346
See application file for complete search history.

(56) References Cited

U.S. PATENT DOCUMENTS

| 6,411,752 | B1 | 6/2002 | Little et al. ..................... 385/17 |
| 2002/0081055 | A1* | 6/2002 | Painter et al. ................. 385/2 |
| 2003/0058908 | A1* | 3/2003 | Griffel ......................... 372/43 |
| 2003/0118289 | A1* | 6/2003 | Watts et al. ................... 385/50 |
| 2004/0126054 | A1* | 7/2004 | Griffel ........................... 385/15 |

* cited by examiner

*Primary Examiner*—Brian M Healy
(74) *Attorney, Agent, or Firm*—Mark Homer

(57) ABSTRACT

A vertically-coupled whispering gallery mode (WGM) resonator optical waveguide, a method of reducing a group velocity of light, and a method of making a waveguide are provided. The vertically-coupled WGM waveguide comprises a cylindrical rod portion having a round cross-section and an outer surface. First and second ring-shaped resonators are formed on the outer surface of the cylindrical rod portion and are spaced from each other along a longitudinal direction of the cylindrical rod. The first and second ring-shaped resonators are capable of being coupled to each other by way an evanescent field formed in an interior of the cylindrical rod portion.

20 Claims, 2 Drawing Sheets

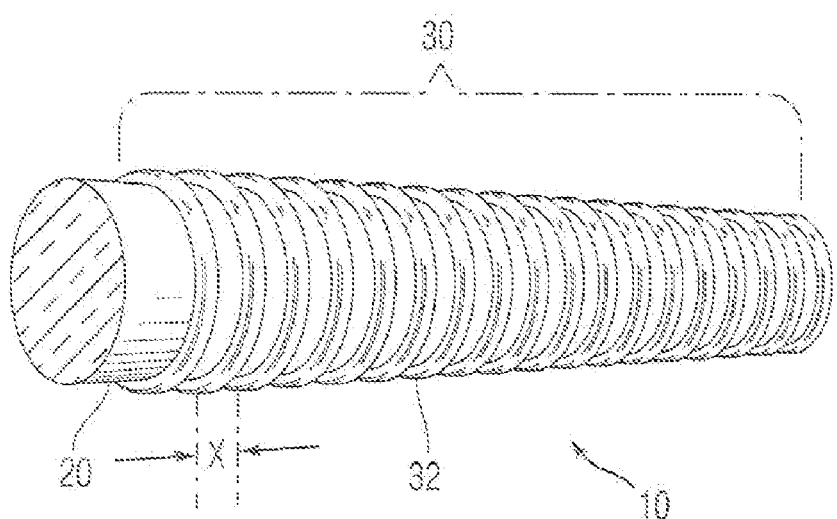
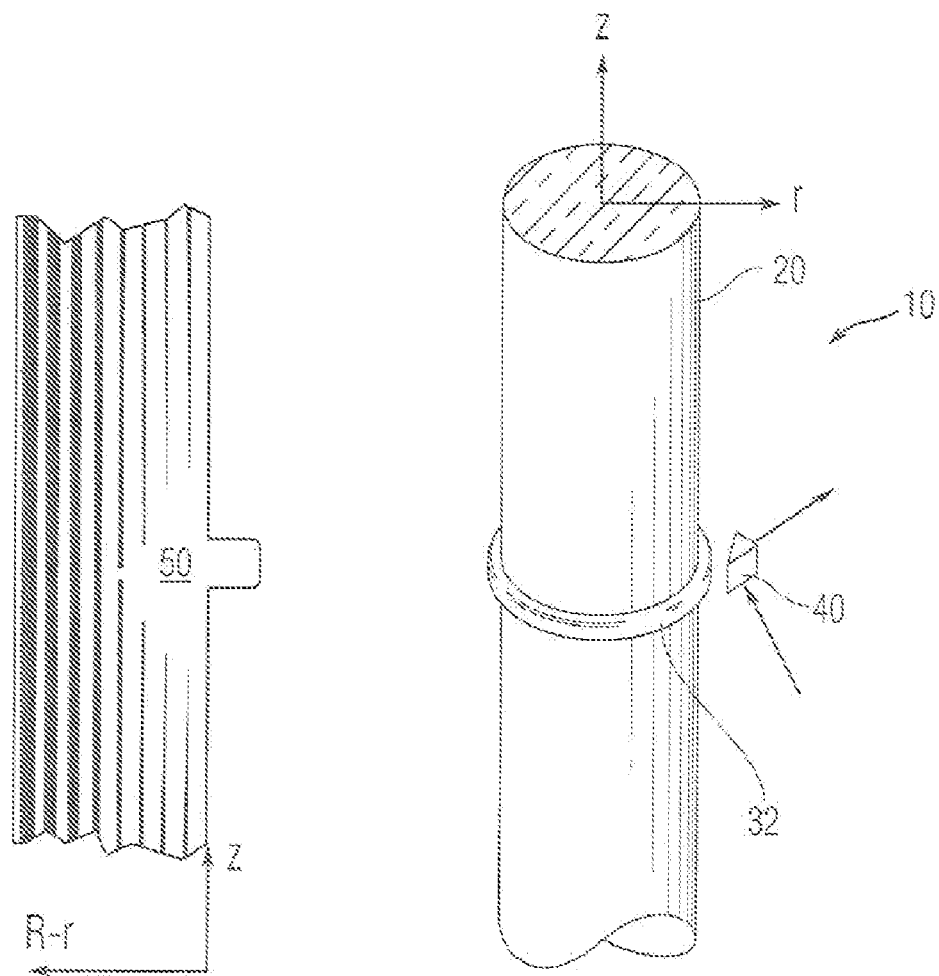
Figure 1
Figure 2a    Figure 2b

VERTICALLY-COUPLED WHISPERING GALLERY MODE RESONATOR OPTICAL WAVEGUIDE, AND METHODS

STATEMENT AS TO FEDERALLY-SPONSORED RESEARCH

The invention described herein was made in the preformance of work under a NASA contract, and is subject to the provisions of Public Law 96-517 (U.S.C. 202) in which the Contractor has elected not to retain title.

FIELD OF THE INVENTION

The present teachings relate to a vertically-coupled whispering galley mode (WGM) resonator optical waveguide, a method of reducing a group velocity of light, and a method of making an optical waveguide. In particular, the present teachings relate to an optical waveguide formed in the shape of a cylindrical rod having a chain of ring-shaped WGM resonators arranged thereon. The optical waveguide of the present teachings can operate as an efficient optical delay line and can be used to route and switch optical pulses in fiber optic communication networks.

BACKGROUND OF THE INVENTION

Currently operational communication networks use the large information carrying capacity of optical fibers to transport the world's data traffic. However, routing and switching are still performed by electronic circuits. In the future it is anticipated that communication networks, such as those related to radar and image transfer, will exploit hugh bandwidths that would be unmanageable through the use of electronic circuits.

Known devices for manipulating optical signals include optical delay lines. However, these optical delay lines utilize field side coupling of open dielectric resonators to create the delay line. Furthermore, installation of these devices is relatively complicated because the resonators need to be carefully placed on a plane surface to insure good coupling between them. The distance between the resonators is required to be controlled with nanometer accuracy because the evanescent field has approximately a hundred nanometer range. In addition, the temperature of the resonators is required to be kept stable and equal between neighboring resonators because temperature fluctuations and gradients result in a mode motion that leads to destruction of the properties of the waveguide. For these reasons, known optical delay lines have only been capable of achieving very short delay times on the order of tenths of a second. They are also characterized by relatively large absorption.

Delay lines characterized by resonant structures formed by photonic band gap materials have also been proposed. However, when implemented, these systems have also been characterized by very short delay times and relatively large absorption.

Accordingly, a need exists for an optical device that can operate as an efficient optical delay line. More generally, a need exists for an optical device that can delay, store, and buffer optical pulses and, thereof, can operate to route and switch optical data signals.

SUMMARY OF THE INVENTION

The present teachings disclose a vertically-coupled WGM resonator optical waveguide device and methods related thereto, that are capable of delaying, storing, and buffering of optical pulses. The optical waveguide includes a cylindrical rod portion having a round cross-section and an outer surface. First and second ring-shaped resonators are formed on the outer surface of the cylindrical rod portion and are spaced from each other along a longitudinal direction of the cylindrical rod. The first and second ring-shaped resonators are capable of being coupled to each other by way an evanescent field formed in an interior of the cylindrical portion.

According to the present teachings, a method of reducing a group velocity of light is provided. The method includes providing an optical waveguide that includes a cylindrical portion and a chain of whispering galley mode resonators formed on the cylindrical portion, the chain including a plurality of ring-shaped resonators each being spaced from each other along a longitudinal direction of the waveguide. The method further includes coupling light to a mode of one of the ring-shaped resonators by directing light into an optical coupler arranged in the vicinity of the one ring-shaped resonator. The method also includes forming an evanescent field in an interior of the cylindrical portion and sequentially coupling each of the ring-shaped resonators in the chain in order to reduce the group velocity of light that is coupled into the waveguide.

According to the present teachings, a method of making an optical waveguide is provided. The method includes providing a cylindrical rod made of an optically transparent material, turning the cylindrical rod, and removing material from the cylindrical rod at pre-set distances along a longitudinal direction thereof to thereby form a chain of ring-shaped resonators along the cylindrical rod.

Additional features and advantages of various embodiments will be set forth, in part, in the description that follows, and, in part, will be apparent from the description, or may be learned by practice of various embodiments. The objectives and other advantages of various embodiments will be realized and attained by means of the elements and combinations particularly pointed out in the description herein.

BRIEF DESCRIPTION OF THE DRAWINGS

FIG. 1 is a perspective view of a vertically-coupled WGM resonator optical waveguide according to various embodiments;

FIG. 2(a) shows the distribution of an evanescent field formed in an optical waveguide having the structure shown in FIG. 2(b);

FIG. 2(b) shows a simplified view of the waveguide of the present teachings including light being coupled into a single ring-shaped resonator by way of an optical coupler.

Figure 3:
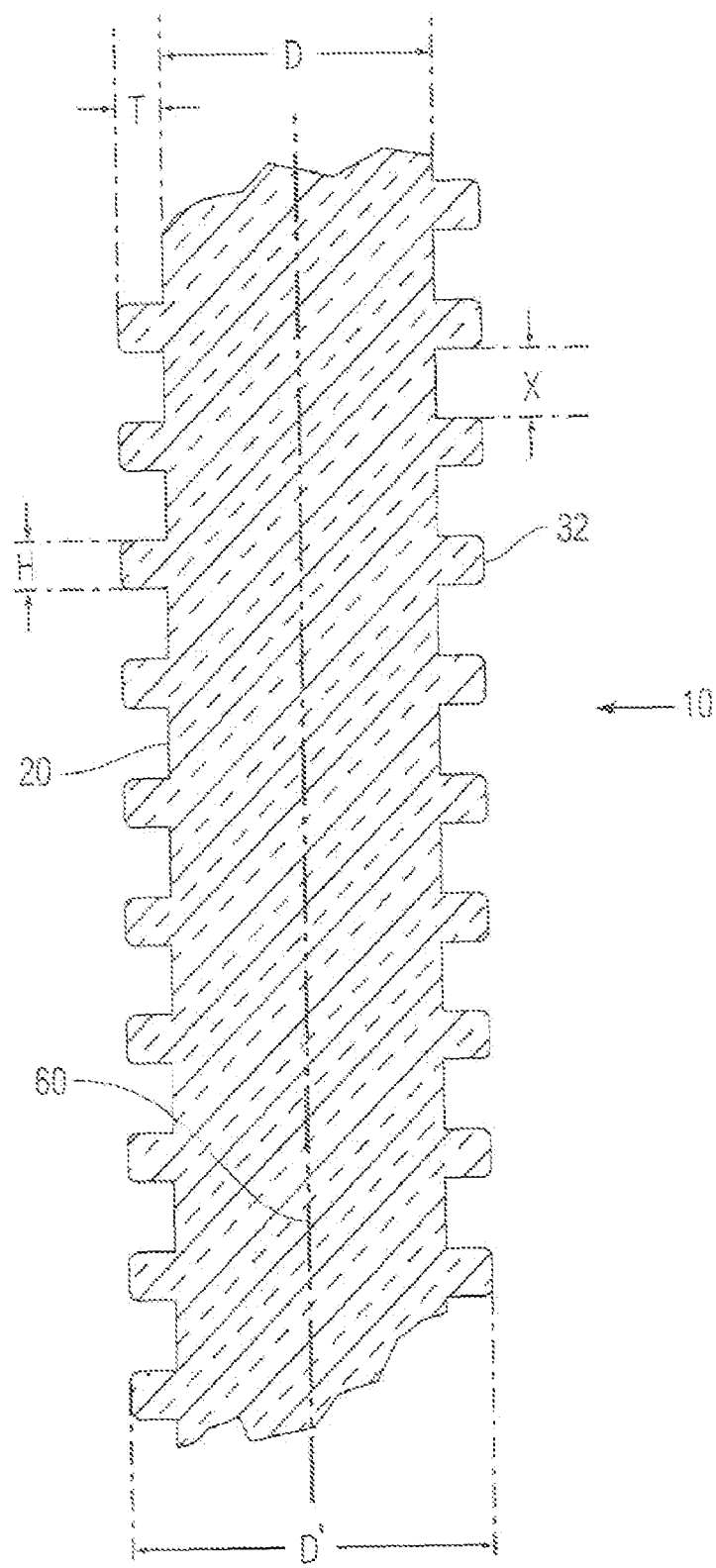
FIG. 3 is a cross-sectional side view of the vertically-coupled WGM resonator optical waveguide according to various embodiments.

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

The present teachings are directed to a vertically-coupled whispering gallery mode (WGM) resonator optical waveguide, a method of reducing a group velocity of light using the vertically-coupled optical waveguide, and a method of making the vertically-coupled optical waveguide. The vertically-coupled WGM resonator optical waveguide of the present teachings can significantly reduce the group velocity of light which has uses in areas relating to, for example, the routing and switching of optical pulses in fiber optic communication networks.

Referring to FIG. 1, an exemplary vertically-coupled WGM resonator optical waveguide 10 of the present teachings is shown. The optical waveguide 10 can include a cylindrical rod or post 20 and a chain of low-contrast WGM resonators 30 formed around the circumference of the cylindrical rod 20. The cylindrical rod 20 and the chain of WGM resonators 30 can form an integral, one-piece optical waveguide structure.

As shown in FIG. 1, the chain of WGM resonators 30 can include two or more ring-shaped or donut-shaped low contrast WGM resonators 32 that are sequentially arranged along a longitudinal axis of the cylindrical rod 20. Each of the ring-shaped WGM resonators 32 of the waveguide 10 of the present teachings can be separated from a neighboring ring-shaped resonator 32 by a predetermined separation distance X. According to various embodiments, this separation distance, X, can be substantially uniform throughout the entire chain of WGM resonators 30, or alternatively, the separation distance can vary along the chain 30. As discussed below, the light altering characteristics of the vertically-coupled WGM resonator waveguide 10 of the present teachings is dependent upon the separation distance between each of the neighboring ring-shaped resonators 32. As a result, the structure of the vertically-coupled WGM resonator optical waveguide 10 of the present teachings is amenable to tuning its photon density of states, i.e. slowing light down.

The vertically-coupled WGM resonator optical waveguide 10 of the present teachings can be made from an optically transparent, electro-optic material. In an exemplary embodiment, the composition of the ring-shaped resonators 32 and/or the cylindrical rod 20 can include lithium niobate ($LiNbO_3$), lithium tantalate ($LiTaO_3$), sapphire ($Al_2O_3$), silica ($SiO_2$) and/or calcium fluoride ($CaF_2$). Preferably, the composition of the components of the optical waveguide 10 can include $CaF_2$ and, more preferably, the optical waveguide 10 can be made substantially entirely form $CaF_2$.

Referring to FIG. 2(b), for illustrative purposes, the waveguide 10 of the present teachings is shown having only a single ring-shaped WGM resonator 32 from its chain of resonators 30. During use of the waveguide 10 of the present teachings, light, such as, for example, linearly polarized narrowband laser light, can be coupled to a mode of one of the ring-shaped resonators 32 by way of an optical coupler 40, such as, for example, a prism or an optical fiber coupler. This light can propagate through the optical waveguide 10 by way of coupling between neighboring ring-shaped resonators 32 through the chain of WGM resonators 30. Coupling between neighboring ring-shaped resonators 32 is achieved through the formation of an evanescent field 50 within the interior of the cylindrical rod 20. The evanescent field 50 allows the ring-shaped resonators 32 to communicate with each other, thereby allowing the propagation of light through the waveguide 10.

FIG. 2(a) illustrates the distribution of an evanescent field 50 formed by the single ring-shaped resonator 32, as shown in FIG. 2(b). In the waveguide 10 of the present teachings, the size of this evanescent field 50 can be relatively large because the ring-shaped resonator 32 is formed at the surface and extends around the circumference of the cylindrical rod 20.

Efficient coupling between each individual ring-shaped resonator 32 can be achieved due to the separation distance between these resonators 32 and because of the ability to form a relatively large evanescent field 50 within the cylindrical rod 20. In the waveguide 10 of the present teachings, the ring-shaped resonators 32 can be arranged relatively close together on the cylindrical rod 20, thereby allowing the resonators 32 to communicate through the intra-rod evanescent field. According to various embodiments, the separation distance, X, between each of the ring-shaped resonators 32 can be as small about 1 μm to about 30 μm, for example. In the optical waveguide 10 of the present teachings, it has been found that as the separation distance between the resonators 32 is increased, the group velocity of light in the waveguide 10 decreases exponentially. For example, the group velocity of light in the optical waveguide 10 of the present teachings is much smaller when the separation distance between the resonators 32 is about 30 μm compared to the group velocity when the separation distance is about 1 μm. It has been found that the optical waveguide 10 of the present teachings is capable of reducing the group velocity of light by as much as a factor of $10^9$.

The intra-rod, coupling achieved by way of the structure of the optical waveguide 10 of the present teachings provides various additional advantages. For example, by coupling the ring-shaped resonators 32 through a cylindrical rod 20 and not though air, as is done in known resonator waveguides, the evanescent field formed in the cylindrical rod 20 is much more stable with respect to external conditions. External conditions can include the properties of ambient air, such as, for example, humidity. In addition, the size of the evanescent field 50 formed in the interior of the cylindrical rod 20 is much larger than an evanescent field that would be formed in air or in a vacuum. Moreover, it has been found that the decay constant of the evanescent field can be readily manipulated by altering the size and shape of the ring-shaped resonators 32 of the waveguide 10 of the present teachings.

Furthermore, in the optical waveguide 10 of the present teachings, the coupling characteristics can be substantially fixed once the following structural parameters are set: the size and shape of the ring-shaped resonators 32, the distance between the ring-shaped resonators 32, and the size and shape of the cylindrical rod 20. Accordingly, the coupling characteristics can be altered by changing the geometry of the optical waveguide 10 (i.e. the size, shape, or separation distance between the ring-shaped resonators 32 and/or the size and shape of the cylindrical rod 20) or its optical properties. With respect to the optical properties of the waveguide 10, these can be changed by varying the temperature of the waveguide 10 or by applying an external pressure or voltage, as in the case when the waveguide 10 is made from a ferroelectric material.

Referring to FIG. 3, the dimensions of the structural features of the vertically-coupled WGM resonator optical waveguide 10 of the present teachings will be described. While various dimensions are described for each structural feature, final dimensions can be dependent upon the environment of use, manufacturing constraints, and the desired light altering characteristics to be achieved.

FIG. 3 shows a cross-section through a longitudinal axis 60 of the waveguide 10. The cylindrical rod 20 can have a round cross-section that is substantially circular and defined by a diameter, D. The diameter, D, can range from about 100

µm to about 1 cm. According to an exemplary embodiment, the diameter, D, can be about 3 mm. It is also contemplated that the cylindrical rod 20 can have a cross-section that is round but non-circular. For example, the cross-section of the cylindrical rod 20 could be oval or ellipsoidal in shape, whereby the major and minor axes are in the ranges as set forth above.

As shown in FIG. 3, a cross-section through the ring of the ring-shaped resonators 32 can include a cross-section that is square whereby the height, H, and the thickness, T, are equal. According to an exemplary embodiment, the height, H, and the thickness, T, of such a cross-section can be about 5 µm. However, it is contemplated that the ring-shaped resonators 32 can have various cross-section. For example, a cross-section through a ring could have a height and thickness that are unequal whereby the cross-section would be rectangular in shape. Accordingly to various embodiments, the cross-sections of the ring-shaped resonators 32 are constant through the circumferential direction, that is, around the diameter of the resonators 32. Moreover, if the cylindrical rod 20 has a cross-section that is substantially circular and defined by a diameter, D, then the outer diameter D' of the ring-shaped resonators 32 can also be circular, whereby D' is larger than D. Notwithstanding the cross-sectional shape of the ring-shaped resonators 32, the resonators 32 can be formed so as to support a plurality of modes. In a preferred embodiment, each of the ring-shaped resonators 32 can be designed to support a single mode.

Still referring to FIG. 3 and as discussed above, each of the ring-shaped resonators 32 that make-up the chain of WGM resonators 30 can be separated from a neighboring resonator 32 by a separation distance, X. The size of the separation distance, X, can depend upon the type and quality of material used to fabricate the waveguide 10 of the present teachings, as well as the potential environment of use of the waveguide 10. According to various embodiments, the separation distance, X, can range from about 1 µto about 30 µm.

According to various embodiments, a method of reducing a group velocity of light can be achieved through the use of the optical waveguide 10 of the present teachings. The method includes coupling light into a mode of one of the ring-shaped resonators 32. This is achieved by directing light into an optical coupler 40 arranged in the vicinity of the one ring-shaped resonator 32 and then forming an evanescent field 50 in an interior of the cylindrical rod portion 20, as shown in FIGS. 2(a) and 2(b). The method further includes sequentially coupling each of the ring-shaped resonators 32 in the chain 30 to reduce the group velocity of light that was coupled into the waveguide 10.

The optical waveguide 10 of the present teachings can be made utilizing various machining technologies. For example, the optical waveguide 10 can be made by securing a cylindrical rod 20 onto a machining machine in order to turn the rod 20 around its longitudinal axis. A cutting tool can then be used to remove material from the cylindrical rod 20 at pre-determined distances to thereby form the chain of ring-shaped resonators 30 along the cylindrical rod 20. According to various embodiments, the cutting tool could be a diamond tipped cutter. While the rod 20 is still being turned, a polisher can be used to polish the surface of the finished surface of the waveguide 10.

The intra-rod coupling achieved by way of the design of the vertically-coupled WGM resonator optical waveguide 10 of the present teachings provides great advantages compared to evanescent field coupling in known resonators.

Being less susceptible to external conditions, the optical waveguide 10 of the present teachings is capable of reducing the group velocity of light by as much as a factor of $10^9$. Accordingly, the waveguide of the present teachings can be used to efficiently route and switch optical pulses in fiber optical communication networks. More particularly, the waveguide 10 of the present teachings 10 can be used as an efficient optical delay line in photonic devices such as those used in spaces exploration applications.

What is claimed is:

1. An optical waveguide comprising:
   a cylindrical rod portion having a round cross-section and an outer surface and having a diameter comprising a constant value across the cylindical rod; and
   a first ring-shaped resonator and a second ring-shaped resonator formed on the outer surface of the cylindrical rod portion and being spaced from each other along a longitudinal direction of the cylindrical rod;
   wherein the first ring-shaped resonator and the second ring-shaped resonator are capable of being coupled to each other via an evanescent field formed in an interior of the cylindrical rod portion.

2. The optical waveguide of claim 1, wherein the waveguide is an integral, one-piece structure.

3. The optical waveguide of claim 1, wherein each of the first and second ring-shaped resonators define a second circular outer diameter, whereby the second circular outer diameter comprises a length of 5 micrometers greater than the diameter of the cylindrical rod.

4. The optical waveguide of claim 1, further comprising a chain of three or more ring-shaped resonators spaced along the longitudinal direction of the cylindrical rod portion, whereby each resonator in the chain is capable of being optically coupled to a neighboring resonator.

5. The optical waveguide of claim 4, wherein each resonator in the chain of ring-shaped resonators is equidistantly spaced from a neighboring resonator along the longitudinal direction of the cylindrical rod portion.

6. The optical waveguide of claim 1, wherein a cross-section through a ring of each ring-shaped resonator defines a rectangle.

7. The optical waveguide of claim 6, wherein the rectangular cross-sections of each ring-shaped resonator define a square.

8. The optical waveguide of claim 1, wherein the cylindrical rod portion and the first and second ring-shaped resonators are made of an optically transparent material.

9. The optical waveguide of claim 8, wherein the optically transparent material is calcium fluoride ($CaF_2$).

10. An optical waveguide comprising:
    a cylindrical portion having a diameter comprising a constant value across the cylindrical portion; and
    a chain of whispering gallery mode resonators formed on the cylindrical portion, the chain comprising a plurality ring-shaped resonators each being spaced from each other along a longitudinal direction of the waveguide;
    wherein the cylindrical rod portion and the chain of whispering gallery mode resonators form a unitary, one piece waveguide structure.

11. The optical waveguide of claim 10, wherein the chain of whispering gallery mode resonators are equidistantly spaced along the longitudinal direction of the waveguide.

12. The optical waveguide of claim 10, wherein at least one of the ring-shaped resonators is arranged such that an evanescent field is formed in an interior of the cylindrical portion when light is coupled to a mode of the least one ring-shaped resonator.

13. The optical waveguide of claim 12, wherein each ring-shaped resonator in the chain of whispering gallery mode resonators is capable of being optically coupled to a neighboring resonator via the evanescent field formed in the interior of the cylindrical portion.

14. The optical waveguide of claim 10, wherein the cylindrical portion and the chain of whispering gallery resonators are made of an optically transparent material.

15. The optical waveguide of claim 14, wherein the optically transparent material is calcium fluoride ($CaF_2$).

16. A method of reducing a group velocity of light comprising:

providing an optical waveguide comprising a cylindrical portion having a diameter comprising a constant value across the cylindrical portion and a chain of whispering gallery mode resonators formed on the cylindrical portion, the chain comprising a plurality ring-shaped resonators each being spaced from each other along a longitudinal direction of the waveguide;

coupling light to a mode of one of the ring-shaped resonators by directing light into an optical coupler arranged in the vicinity of the one ring-shaped resonator;

forming an evanescent field in an interior of the cylindrical portion; and sequentially coupling each of the ring-shaped resonators in the chain to reduce the group velocity of light that is coupled into the waveguide.

17. A method of making an optical waveguide comprising:

providing a cylindrical rod made of an optically transparent material;

turning the cylindrical rod; and removing material from the cylindrical rod at predetermined locations along a longitudinal direction thereof to thereby form a chain of ring-shaped resonators along the cylindrical rod and provide a constant rod diameter across the cylindrical rod.

18. The method of claim 17, further comprising polishing a surface of the waveguide.

19. The method of claim 17, wherein the step of removing material from the cylindrical rod includes placing a diamond cutter into contact with the turning cylindrical rod.

20. A vertically coupled whispering gallery mode optical waveguide capable of reducing the group velocity of light traveling in a communication network comprising the features of claim 1.

* * * * *